B. DE MATTIA.
METHOD OF MAKING SHOES OR CASINGS FOR PNEUMATIC TIRES.
APPLICATION FILED FEB. 4, 1920.
1,428,419.
Patented Sept. 5, 1922.
4 SHEETS—SHEET 1.
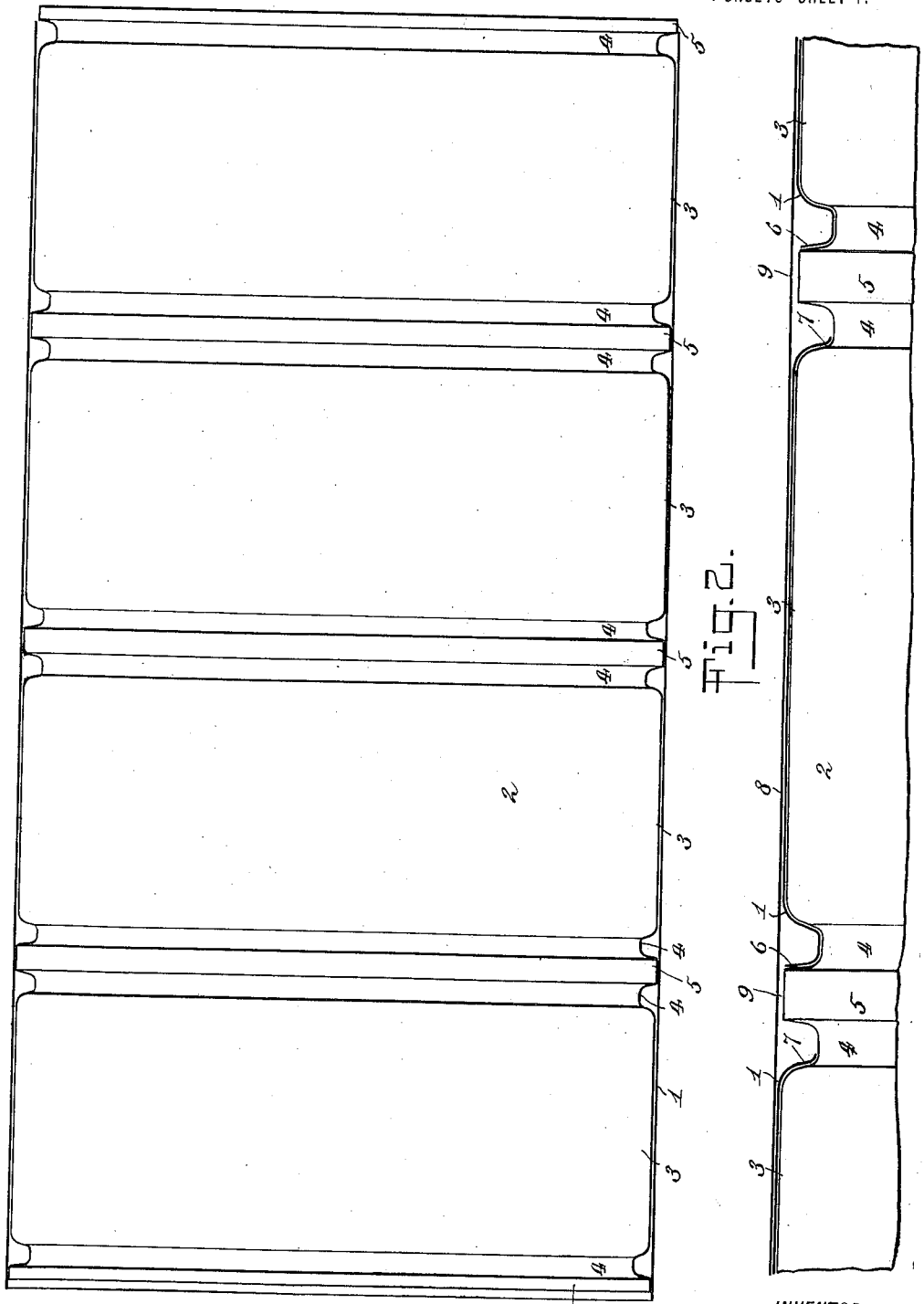
WITNESSES:
INVENTOR
Barthold De Mattia.
BY
ATTORNEYS B. DE MATTIA.
METHOD OF MAKING SHOES OR CASINGS FOR PNEUMATIC TIRES.
APPLICATION FILED FEB. 4, 1920.
1,428,419.
Patented Sept. 5, 1922.
4 SHEETS—SHEET 2.
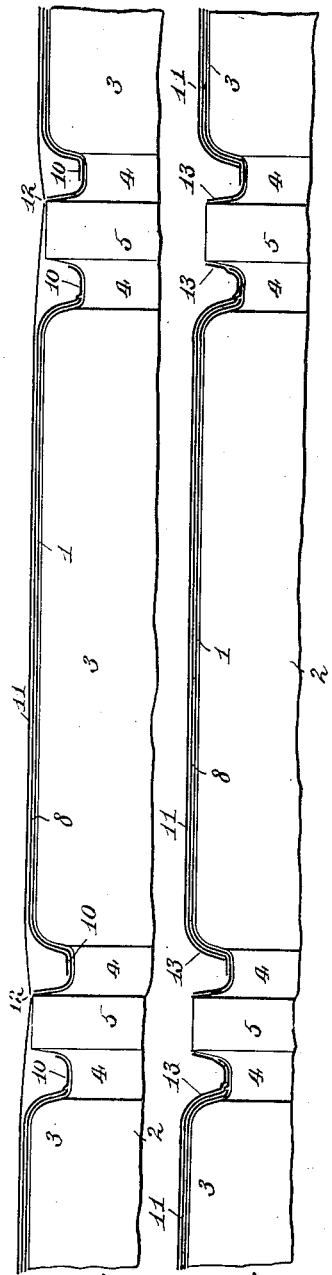
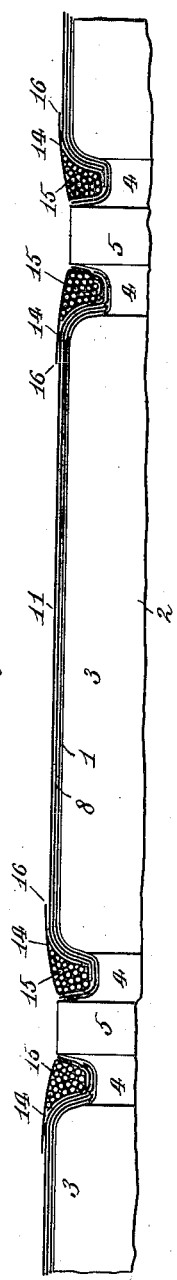
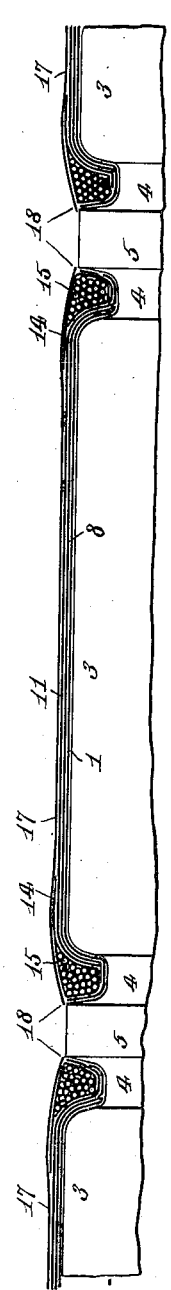
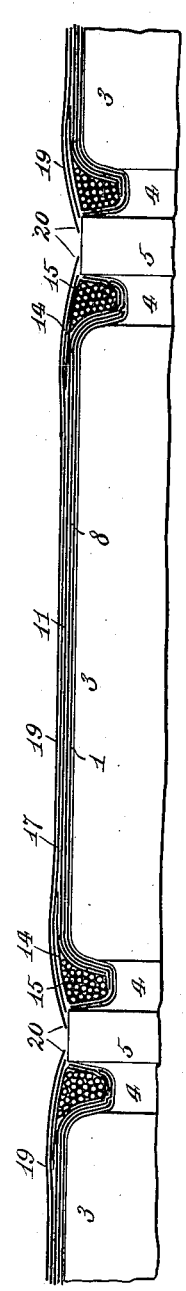
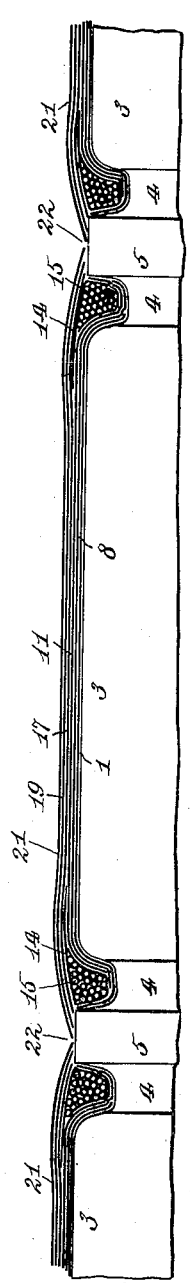
Fig. 3.  Fig. 4.  Fig. 5.  Fig. 6.  Fig. 7.  Fig. 8.
WITNESSES
William P. Goebel
[signature]
INVENTOR
Barthold De Mattia.
BY [signature]
ATTORNEYS B. DE MATTIA.
METHOD OF MAKING SHOES OR CASINGS FOR PNEUMATIC TIRES.
APPLICATION FILED FEB. 4, 1920.
1,428,419.
Patented Sept. 5, 1922.
4 SHEETS—SHEET 3.
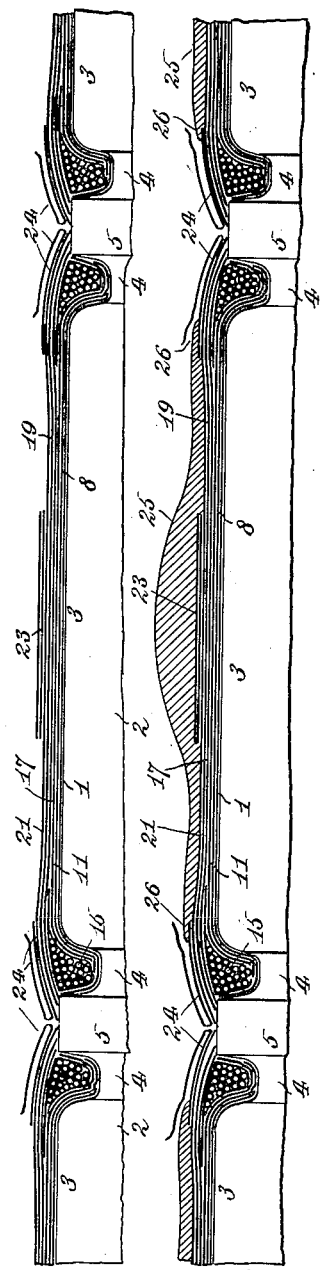
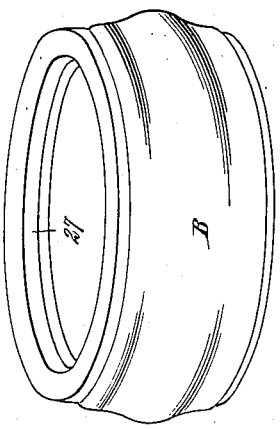
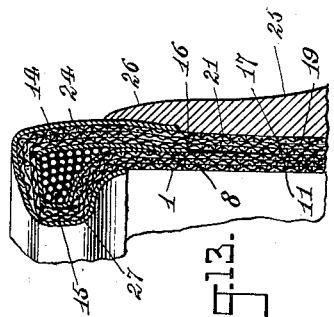
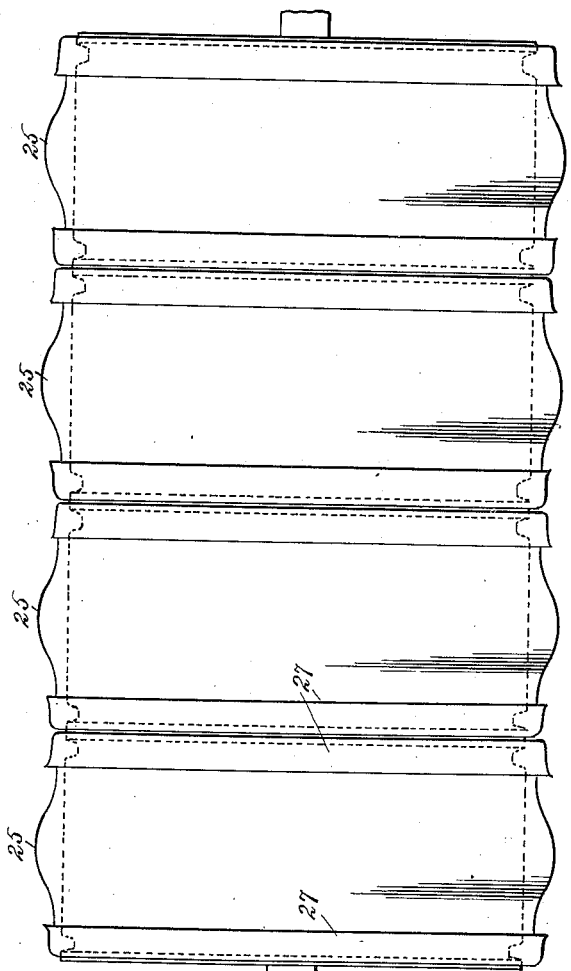
WITNESSES
William P. Goebel
INVENTOR
Barthold De Mattia.
BY
ATTORNEYS

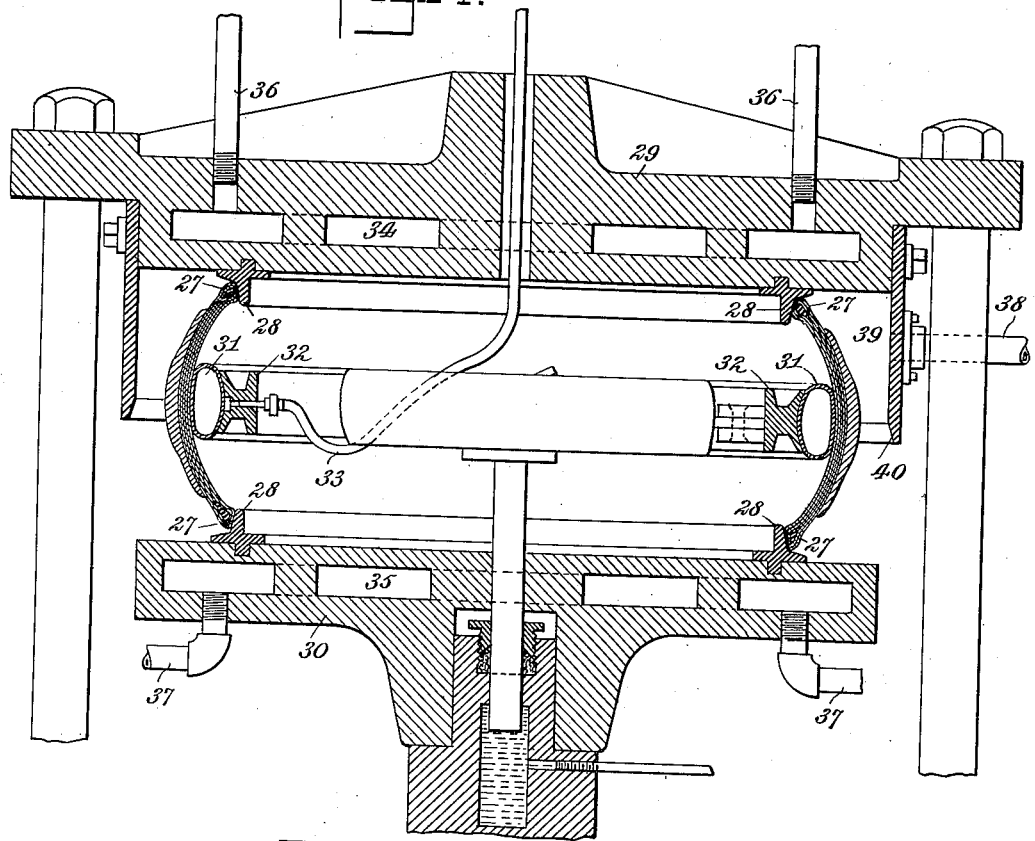
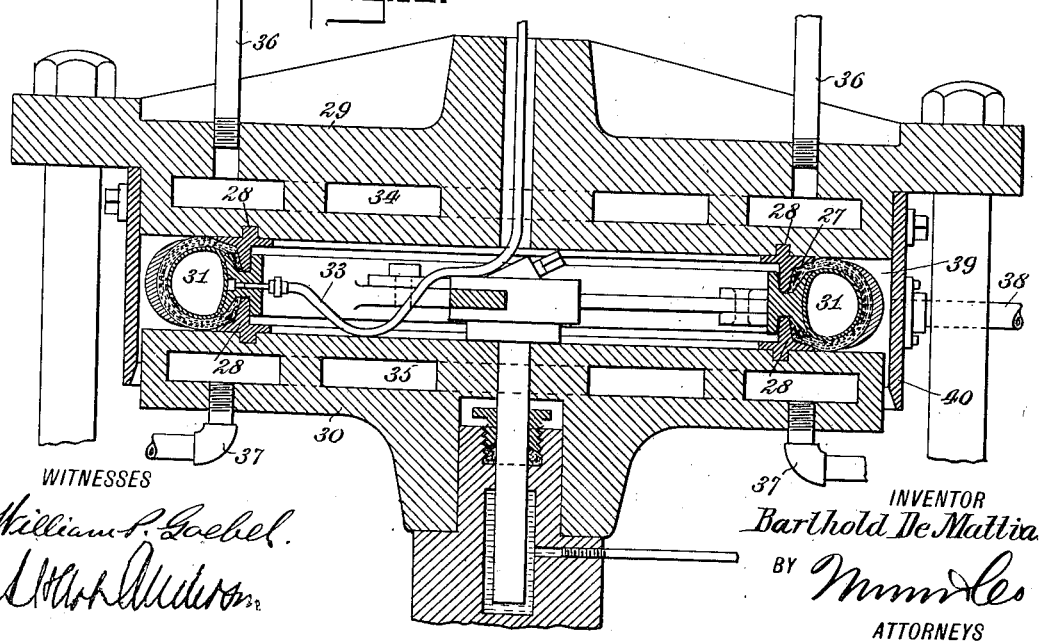

Patented Sept. 5, 1922.

1,428,419

UNITED STATES PATENT OFFICE.

BARTHOLD DE MATTIA, OF CLIFTON, NEW JERSEY.

METHOD OF MAKING SHOES OR CASINGS FOR PNEUMATIC TIRES.

Application filed February 4, 1920. Serial No. 356,210.

*To all whom it may concern:*

Be it known that I, BARTHOLD DE MATTIA, a citizen of the United States, and resident of Clifton, in the county of Passaic and State of New Jersey, have invented a new and useful Improvement in Methods of Making Shoes or Casings for Pneumatic Tires; and it has for its object to provide an improved method of manufacturing shoes or casings by first forming a cylindrical blank provided with beaded edges, which blank is thereafter expanded along its longitudinal medial line between the beaded edges, while the beaded edges are simultaneously caused to approach each other, to secure the desired form in cross-section, after which shaping pressure is applied and the shoe or casing vulcanized in the ordinary manner.

To the above ends the present invention consists of the method of manufacturing shoes or casings which will be hereinafter described and claimed.

The present invention is illustrated in the accompanying drawings in which—

Figure 1 illustrates the first step in the building up of the cylindrical blank as said step is employed in the simultaneous production of a plurality of blanks.

Figure 2 shows a view enlarged as compared with Figure 1 wherein succeeding steps are illustrated.

Figure 3 shows a view similar to Figure 2 showing a succeeding step.

Figure 4 shows a similar view showing a succeeding step.

Figure 5 illustrates the formation of the bead.

Figure 6 shows a succeeding step.

Figure 7 shows a succeeding step.

Figure 8 shows the condition of the blank after the application thereto of the final layer of the blank forming fabric strips.

Figure 9 illustrates the step of applying the chafing strips.

Figure 10 illustrates the application of the tread forming strips and chafing strips.

Figure 11 shows a plurality of completed cylindrical blanks after removal from the drum.

Figure 12 shows the cylindrical tire blank after it has been removed from the drum and with the chafing strip wrapped about the bead forming edge.

Figure 13 shows a cross-section through one edge of the cylindrical blank.

Figure 14 illustrates the expanding and shaping of the blank to form the shoe.

Figure 15 illustrates the final step of expanding and pressing and shaping the beaded edges of the blank forming the completed shoe or casing before vulcanization.

It will be understood that Figures 1–10 inclusive are supposed to show transverse sections through the tire blanks in process of construction and Figures 14 and 15 show transverse sections, not only through the blanks being operated upon, but through certain instrumentalities which are used in expanding and shaping the blanks and which form the subject matter of a companion application filed by me of even date herewith, Serial No. 356,209, and which, of course, forms no part of the present invention.

In the formation of the cylindrical tire blanks and the ultimate formation of a shoe or casing therefrom, a layer of fabric 1 is wrapped about a suitable former which in the illustrated embodiment consists of a drum 2. The layer of fabric 1 is the usual woven or cord textile fabric coated and impregnated with rubber and forms what is generally known as "tire fabric."

As it is proposed to form a plurality of blanks simultaneously, the drum 2 is composed of a plurality of forming surfaces there being four such surfaces shown in the drawings adapted to permit the formation of four cylindrical blanks simultaneously.

The surface of the drum comprises the relatively wide bed surfaces 3 and the bead forming grooves 4 bounded by the relatively narrow ribs 5. After the first strip of fabric 1 is wrapped about the drum 2 as shown in Figure 1, and its meeting edges brought together and secured to form a butt joint, this layer is cut so as to divide it into four sections, the line of cut coinciding with the inner or left-hand edge of the ribs 5.

Thereafter the strip 1 is forced into the grooves 4, as shown in Figure 2 of the drawings, and at the left-hand groove it will entirely cover the surface of the groove extending substantially to the upper surface of the ribs 5 as shown at 6, but at the right-hand end the edge of the strip 1 will cover practically only the right-hand surface of the groove 4 as shown at 7.

Assuming that four sections are being operated upon, each section of the first layer 1 will be as shown in Figure 2 of the drawings after being cut and forced into the grooves 4.

At this point another layer of fabric 8 is superimposed upon and wrapped about the drum and the layer 1, and like the layer 1 the meeting edges of the layer 8 will be brought together upon a diagonal line forming a butt joint and will adhere to the surface of the previously applied layer. If the layer 1 has been wrapped about the drum by turning the drum in one direction, the layer 8 will be wrapped about the drum by turning it in a reverse direction, so that the surface of the fabric which was uppermost in wrapping the layer about the drum will be underneath and in contact with the surface of the layer 1 in the layer 8.

After the layer 8 has been wrapped about the drum and the sections formed by the layer 1 as shown in Figure 2, it is cut at the points 9 upon a line substantially parallel with the edges of the ribs 5 and centrally disposed with relation to the intermediate ribs 5, but coincident to the outer edges of the end ribs 5.

After being cut upon the lines 9 the strip of fabric 8 is forced into the grooves 4 in close contact with those portions of the layer 1 which have been previously forced into the grooves, as shown in Figure 3, the ends extending substantially to the center of the grooves as shown at 10 in Figure 3.

Thereafter another layer of fabric is wrapped about the drum as shown in Figure 3 and pressed in close contact with the preceding fabric layer 8 and united by a butt joint. The layer 11 is cut at the points 12 corresponding to the right-hand edges of the ribs 5, as shown in Figure 3.

Thereafter the ends of the sections formed by the fabric layer 11 are forced into the grooves 4 as shown at 13 in Figure 4.

At this point each of the sections of the plurality of cylindrical blanks consists of three layers of fabric, which at their ends have been forced into the grooves as shown in Figure 4, and by reason of the fact that the sections have been cut off at different points with relation to the grooves, the edges will be tapering or reduced in thickness within the grooves.

The next step consists in the formation of the bead, and as shown, consists in laying in the groove a flipper strip 14 and winding therein sufficient rubber coated wire 15 to fill up the groove 4, as shown in Figures 5, 6, 7 and 8.

It will be understood that this rubber coated wire is of indefinite length and that the bead formed thereby consists of a sufficient amount of wire wrapped in a continuous strand, about and within the grooves, to completely fill the grooves thus forming a bead or ring of an endless and jointless construction. After the bead has been formed, as shown in Figure 5, the flipper strip 14 is turned over covering the bead and extending inward, as shown at 16 in Figure 5.

Thereafter, as shown in Figure 6, another strip of fabric 17 is wrapped about and superimposed upon the blank and is cut off at opposite ends and on lines corresponding to the edges of the ribs 5, as shown at 18 in Figure 6.

Thereafter another strip of fabric 19 is wrapped about the blank and cut up into sections as shown at 20 (see Figure 7) and thereafter another strip of fabric 21 is wrapped about the blank and cut up into sections as shown at 22 (see Figure 8).

It will be observed that preferably the strips 17, 19 and 21 gradually increase in length as shown clearly in Figures 6, 7 and 8.

Thereafter the chafing strips 24 are applied along each edge of each blank overlying the bead (see Figure 9).

Thereafter a tread strip 25 and cushioning strips 23 are secured about each blank and at its opposite edges 26 overlying the inner edge of the chafing strip 24.

This completes the structure of the blank in so far as it is built up on the drum, and at this stage the sections will be in the condition shown in Figure 11.

At this point the tire blanks are removed from the drum or forming bed and the chafing strips 24 wrapped about the bead and secured upon the inner surface of the cylindrical blank, as shown at 27 in Figures 12 and 13, which completes the operation of forming the cylindrical tire blank indicated by the letter B in Figure 12.

It will be observed that in the formation of the cylindrical tire blank B, the fabric has been practically in the same plane and that all parts of the blank, with the exception of the bead forming parts, are substantially in the same plane and in a plane corresponding substantially with the beaded edges which project slightly below the plane.

Having formed the cylindrical blanks, as described, they are now expanded and shaped, as shown in Figures 14 and 15 wherein each beaded edge is engaged by a bead shaping ring 28 one of which is carried by a fixed cross-head 29 and the other by a movable table 30 arranged to cause the bead shaping rings to approach each other as the shoe or casing is expanded between the beaded edges.

Any suitable means may be provided for expanding the blank, that shown consisting of an expansible tube 31 carried by a suitable support 32 and receiving air through a pipe 33, the arrangement being such that as the rings 28 are caused to approach each other the admission of air to the tube 31 expands the tube and the blank between the beaded edges, and this expansion of the blank and the pressing of the beaded edges towards each other, is continued until the parts assume the position shown in Figure 15, at which time the shoe or casing acquires the form required in the completed article with the bead forming edges and the tire between those edges pressed about the inflated tube 31.

As it is desirable to subject the blank to the action of heat during this operation of expanding and shaping, the cross-head 29 is provided with a heating chamber 34 and the table 30 with a heating chamber 35 to which heat may be admitted by the connections 36 and 37 respectively, and also heat may be admitted directly to the surface of the blank by means of a pipe 38 which enters the space 39 enclosed by a flange 40.

It will of course be understood that any suitable means may be provided for moving the movable parts of the apparatus during the operation of inflating and pressing the tire blanks, but as the apparatus forms the subject matter of one of my co-pending applications, Serial No. 356,209 and in and of itself forms no part of the present invention, I deem it unnecessary to specifically describe the apparatus herein.

It will of course be understood that after the blank has remained under pressure, as shown in Figure 15, for a sufficient length of time to impart a permanent set thereto, it will be removed and vulcanized in the usual manner.

I claim:

1. The method of forming shoes or casings for pneumatic tires, which consists in building up successive layers of superimposed fabric and separating such layers into cylindrical sections as they are built up, whereby to form a plurality of cylindrical tire blanks simultaneously and subsequently expanding and shaping each section.

2. The method of forming shoes or casings for pneumatic tires, which consists in wrapping a plurality of separate and independent layers of fabric about each other, severing such layers independently as they are applied on lines which are offset with relation to each other to form a plurality of cylindrical sections, applying beads at the ends of each section, applying other layers of fabric to cover the beads and severing them as applied, applying a tread strip to each section and subsequently expanding and shaping each section.

3. The method of forming shoes or casings for pneumatic tires, which consists in wrapping a plurality of separate layers about each other, severing each layer independently as it is applied to form a plurality of cylindrical sections forming a groove at the end of each cylindrical section, winding a continuous bead-forming wire in each groove to fill the grooves to form a bead at the end of each section, applying other layers of fabric about each section and severing such layers as they are applied, applying a tread strip to each section and subsequently expanding and shaping each section.

4. The method of forming shoes or casings for pneumatic tires, which consists in building up the body portion, forming a groove at or near each end of the body portion, winding a continuous bead forming wire within such grooves to form beads, applying a covering over the beads and finally shaping and vulcanizing.

5. The method of forming shoes or casings for pneumatic tires, which consists in building up the body portion, forming a groove at or near each end of the body portion, winding a continuous rubber covered wire within such grooves to form beads, applying a covering over the beads and shaping and vulcanizing.

BARTHOLD DE MATTIA.

Witness:
MILES C. WHITEHEAD.